Figure 27:
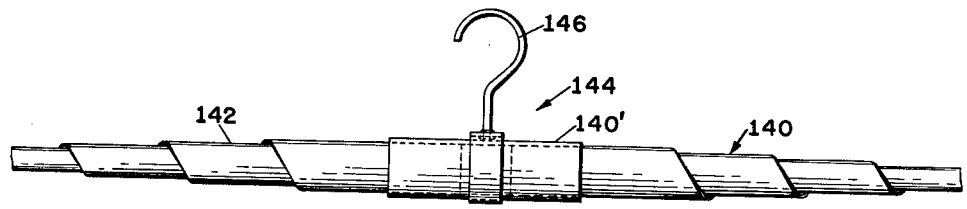

June 15, 1965        L. J. BECK        3,188,675
CLEANING TOOL OR THE LIKE
Filed Sept. 7, 1962        3 Sheets-Sheet 1
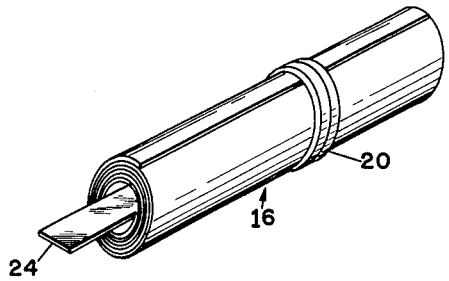
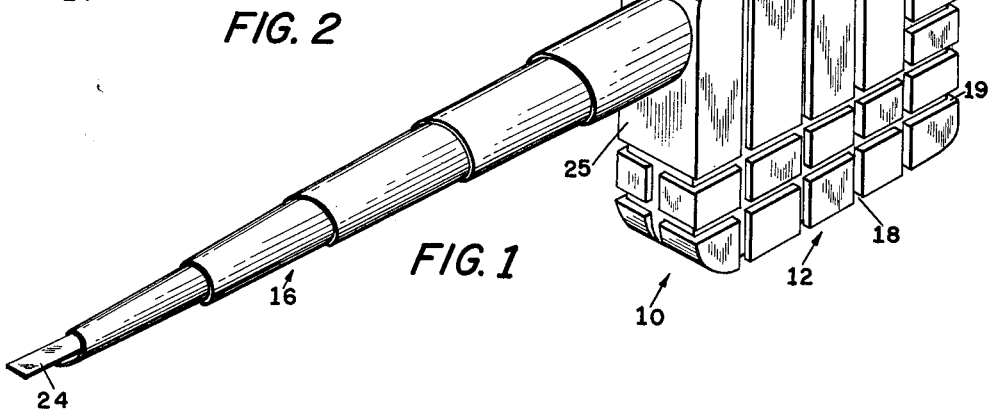
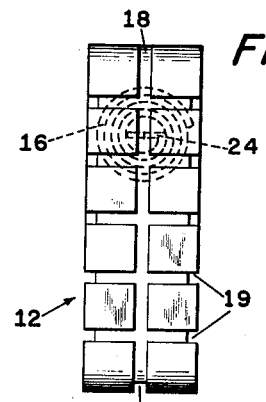
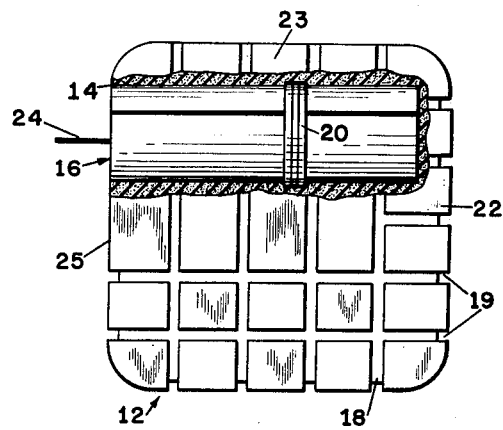
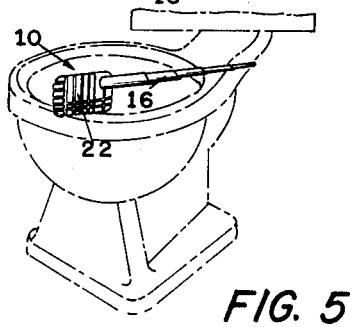
INVENTOR
LAWRENCE J. BECK
BY
ATTORNEY June 15, 1965
L. J. BECK
3,188,675
CLEANING TOOL OR THE LIKE
Filed Sept. 7, 1962
3 Sheets-Sheet 2
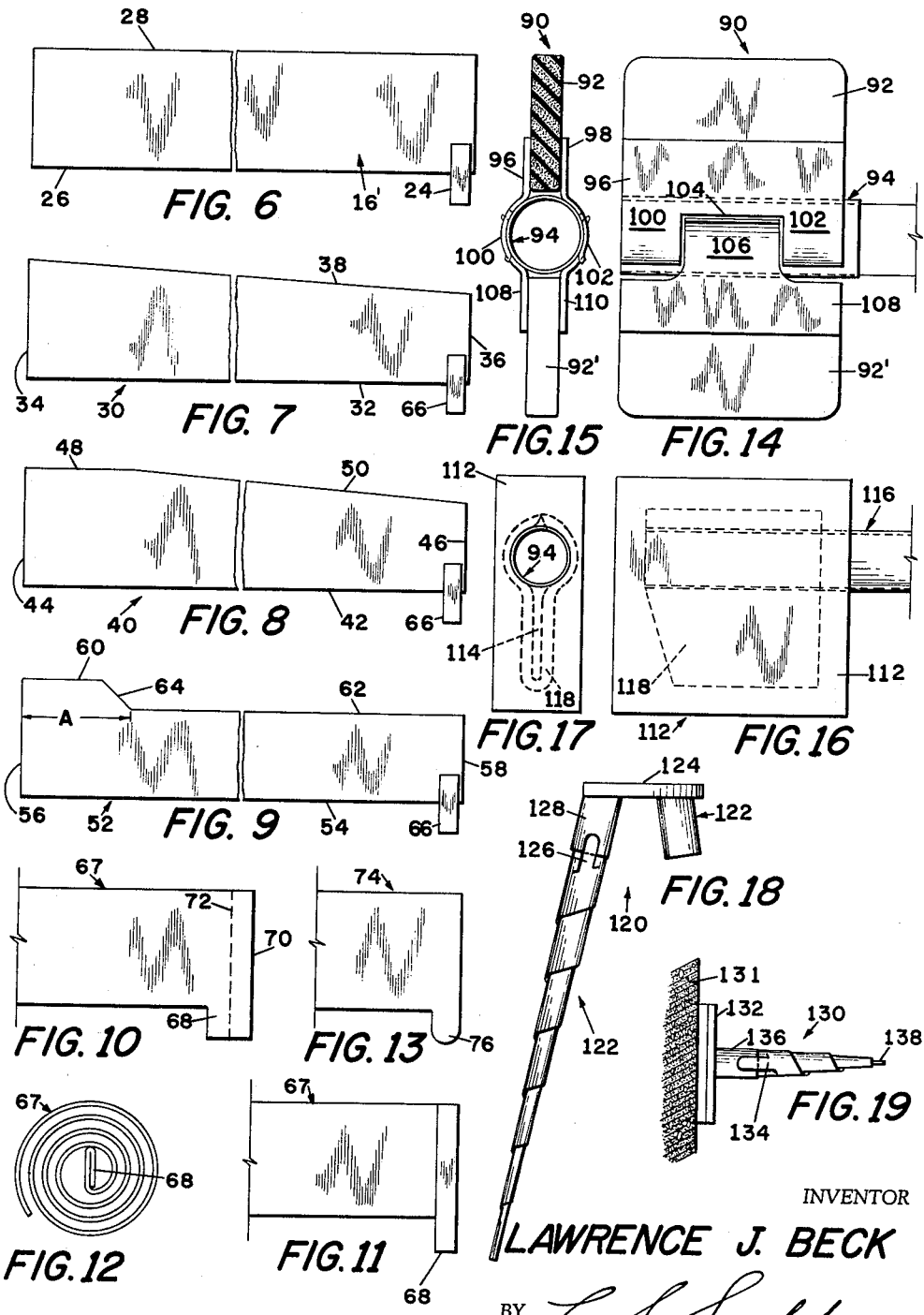
INVENTOR
LAWRENCE J. BECK
BY L. S. Saulsbury
ATTORNEY

INVENTOR
*LAWRENCE J. BECK*

BY
ATTORNEY

United States Patent Office 3,188,675
Patented June 15, 1965

3,188,675
CLEANING TOOL OR THE LIKE
Lawrence J. Beck, 653 Valley Road,
Upper Montclair, N.J.
Filed Sept. 7, 1962, Ser. No. 222,011
5 Claims. (Cl. 15—244)

This invention relates to an extensible tubular member which forms an integral handle and to the combination of such an extensible tubular member in a structure of which it forms a part.

The extensible tubular member of the invention has particular utility when used as the integral handle of disposable cleaning tools, such as the handle of a disposable sponge or pad for use in cleaning toilet bowls. However, the extensible tubular member of the invention may also be used in many other applications. For example, it may be used to form the integral handle of a disposable toothbrush or other types of brushes.

Accordingly, it is an object of this invention to provide an extensible tubular member which may be used as an integral handle.

It is another object of the invention to provide a light weight, economical, extensible tubular member which may be retracted into a short length for shipping, storage, and merchandising purposes, but which may be extended into a substantially longer length to form a handle.

It is another object of the invention to provide an extensible tube adapted to be received by and form a part of many different types of devices, and which may be packed, stored, transported, and merchandised in a small compact form but may be easily extended to form a long, light-weight, tapered tubular handle.

It is still another object of the invention to provide an extensible tubular member which may be packed, stored, transported and merchandised in a small compact form, and which may be extended when the device with which it is used is ready for use into an elongated tubular member, and including means for locking the tube in its extended position, the locking means being so characterized as to permit retraction of the tube from its elongated shape if required for the purposes of the application in which the tubular member is used.

It is still another object of the invention to provide in combination with a low cost, sanitary, and disposable cleaning tool for toilet bowls and the like an extensible handle member which remains retracted in the body of the cleaning tool to form a small compact package which may be shipped, stored, or displayed in a store using a minimum of space until the tool is ready for use, at which time the extensible tubular portion may be extended to form the handle for the tool.

Still another object of the invention is to provide a disposable cleaning tool for toilet bowls and the like, including a disposable sponge mop or cleaning pad which is adapted to receive an integral extensible tubular handle, and in which the tool and handle have a low manufacturing cost such that the entire cleaning tool, including the extensible handle, may be disposed of after a single use without undue economic waste.

In achievement of these objectives, there is provided in accordance with this invention an extensible tubular member for use as an integral handle, the extensible tubular member being formed of a thin elongated strip which is spirally wound into a coil and held at a desired outside diameter by means of a suitable band, clip, or other externally applied compression force which tends to close the spirally wound coil. A suitable tab or other means is provided to permit drawing out the inner turns of the coil in an axial direction to form an elongated tapered helically wound tubular member which is held locked in its elongated position by the band, clip, or other compression means acting on the outermost turn of the spirally wound strip.

The elongated tubular member may form the handle of a cleaning device, such as a low-cost disposable cleaning tool for toilet bowls, in which case the sponge or cleaning pad of the cleaning device may include a recessed passage for receiving the tubular member in its contracted form as originally wound, the tubular member being extensible to its elongated form when it is desired to use the cleaning tool.

Further objects and advantages of the invention will become apparent from the following description taken in conjunction with the accompanying drawings, in which FIGURE 1 is a perspective view of a toilet bowl cleaning tool utilizing the extensible handle of the invention, FIG. 2 is a perspective view of the extensible handle of the invention in its retracted form, FIG. 3 is an end view of the toilet bowl cleaning device of FIG. 1, viewed from the right-hand end of FIG. 1, FIG. 4 is a side elevational view, partially in section, showing the extensible handle positioned inside the sponge or pad of the cleaning tool, the handle being in its retracted position, FIG. 5 is a perspective view, showing the cleaning tool of FIGS. 1–4 being used for cleaning a toilet bowl, FIG. 6 is a view of one form of blank which may be used to form the extensible tubular member, the blank of FIG. 6 having the opposite longitudinal edges thereof parallel to each other, FIG. 7 is a modified form of blank which may be used for forming the extensible tubular member, in which one of the longitudinal edges is inclined or tapered with respect to the other longitudinal edge, FIG. 8 is a view of a still further modified form of blank which may be used for forming the extensible tubular member, in which one of the longitudinal edges of the blank is parallel to the other longitudinal edge for a portion of its length, and inclined with respect thereto for the rest of its length, FIG. 9 is a view of a still further modified form of blank which may be used to form the extensible tubular member, in which one of the longitudinal edges of the blank has a stepped configuration, FIG. 10 is a view showing the innermost or core end of a blank used for forming the extensible tubular member, in which the pull tab is formed integrally with the end of the blank, FIG. 11 is a view of the blank of FIG. 10, with the end edge folded over upon itself to form a reinforced pull tab for the extensible tubular member, FIG. 12 is a view of the blank of FIGS. 10 and 11 when spirally wound upon itself to form the extensible tubular member, FIG. 13 is a view of the innermost or core end of a still further modified blank for forming the extensible tubular member, having a modified integral tab construction, FIG. 14 is a view of a modified embodiment of cleaning device, in which two separate sponge elements are used, and in which the extensible handle of the cleaning device is secured to the sponge elements by means of clamp-like elements, FIG. 15 is an end view of the modified cleaning device of FIG. 14, FIG. 16 is a side elevational view of a modified form of a sponge member in which the interior of the sponge is impregnated with an adhesive-type stiffening agent to reduce the water absorption of the sponge and to improve its handling properties.

Figure 28:
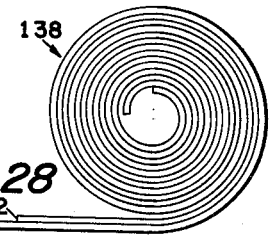
Figure 29:
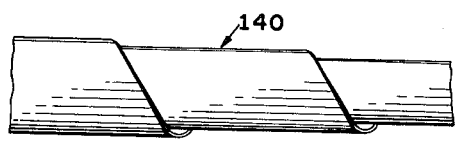
Figure 25:
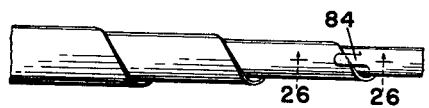
Figure 26:
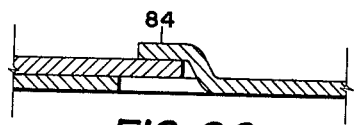
Figure 20:
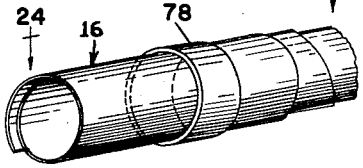
Figure 21:
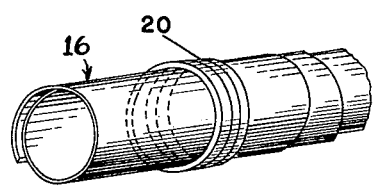
Figure 22:
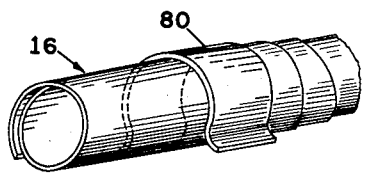
Figure 23:
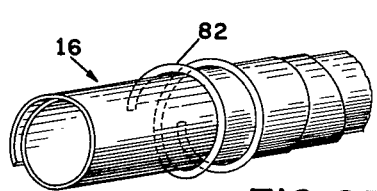
Figure 24:
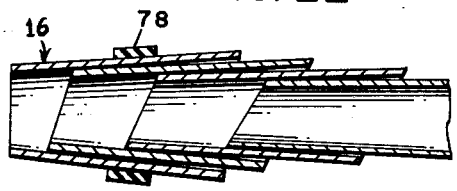

FIG. 17 is an end view of the cleaning device of FIG. 16,

FIG. 18 is an elevational view of a tripod in which the extensible tube forms the leg of the tripod, FIG. 19 is a view of the extensible tube member used as an extensible wall-mounted hook or support, FIG. 20 is a perspective view of the inner end of the extensible tube member in extended position, showing an elastic band mounted on the inner end of the tube to lock the tube in extended position, FIG. 21 is a view similar to FIG. 20, but showing a modified form of locking means to hold the tube in extended position, FIG. 22 is a view similar to FIG. 20, but showing the use of a U-shaped spring clip to lock the tube in extended position, FIG. 23 is a view similar to FIG. 20 but showing the use of a helical spring to hold the extensible tube in extended position, FIG. 24 is a view in longitudinal section along lines 24—24 of FIG. 20, showing the relation of the successive spiral turns of the tube when the tube is in extended position, FIG. 25 is a view of an extensible tube having a cutout lug device which forms a locking means to hold the tube in its extended position, FIG. 26 is an enlarged view in section along line 26—26 of FIG. 25 showing details of the locking lug of FIG. 25, FIG. 27 is a view showing a clothes hanger device having two oppositely disposed clothes supporting arms, each formed of an extensible tube, FIG. 28 shows the original coil formation of the two superposed spirally wound blanks which form the two extensible arms of the clothes hanger of FIG. 27, and FIG. 29 is an elevational view, partially cut away, of one of the tubular members of FIG. 27.

Referring now to the drawings, there is shown in FIG. 1 a toilet bowl cleaning tool generally indicated at 10, including a sponge member generally indicated at 12, having a recess 14 extending inwardly from one end thereof for part of the length of the sponge to receive the extensible handle 16 of the invention. The sponge 12 may be formed of polyurethane, and may have a waffle-like decorative or utilitarian pattern applied to the working surfaces thereof, including the vertical and horizontal grooves 18 and 19, respectively, these grooves being formed by applying a heated grid to the surfaces of the sponge 12. To enhance the cleaning properties of the sponge 12, various surface portions thereof, as, for example, the surface areas covered by the small blocks 22, and the surfaces of the vertical and horizontal edges 23, may be stiffened by applying to these surfaces a coating of a water-resistant starch-base adhesive, which remains rigid when wet. The same surface areas represented by the small blocks 22 and also the surfaces of the vertical and horizontal edges 23 may also be protected by an overcoat of a waterproof material. The sponge pad 12 may also be impregnated with a suitable cleaning compound if desired.

The extensible handle member generally indicated at 16 is formed of an elongated strip of suitable material which is spirally wound upon itself from a blank such as any one of those shown in FIGS. 6–13, inclusive, for example, to form a compact, substantially cylindrical coil shown in FIG. 2. The blank or strip which is rolled into the spiral coil handle 16 may be made of many different types of material, such as boxboard, coated paper board, bristol type board, plastic sheet material, such as that made of styrene, acetate, vinyl plastic, or other suitable plastic material. Any of these various materials may be uncolored or colored, and may have a gloss or mat finish, as desired. The strip material may also be made of metal spring stock, of steel, bronze, aluminum, or other suitable material. The handle may be also made of material which may disintegrate in water after a predetermined soaking period.

The extensible coil handle 16 when in the compact, retracted form shown in FIG. 2 has a length substantially equal to the length of the recess 14 in the sponge 12, so that when the contracted handle 16 is positioned in the recess 14 of the sponge, the outer end of the handle 16 is substantially flush with the end edge of the sponge pad into which the recess 14 opens.

In order to permit withdrawing the inner turns of the spirally wound handle 16 from its contracted shape as originally wound to form the extended tubular member shown in FIG. 1, the elongated strip from which the coil is spirally wound is provided adjacent the inner end thereof which forms the innermost turn of the spirally wound coil, with a suitable tab 24 which may be grasped by the user to permit withdrawing the inner turns outwardly in an axial direction to form the extended handle as seen in FIG. 1. When this is done, the inner turns of the coil move axially outwardly in a helical formation as shown in FIG. 1 to form an extended tubular member which tapers axially in approaching the outer end thereof.

There are shown in FIGS. 6–12, inclusive, various forms of the blank from which the spirally wound coil may be formed. The various shapes of blanks shown in FIGS. 6–12 provide variations in the rigidity of the resultant elongated tubular member, as required for different applications in which the tubular member may be used. Thus, blank 16', of FIG. 6 is of rectangular shape and includes two longitudinal edges 26 and 28 which are parallel to each other throughout their entire length. The blank generally indicated at 30 in FIG. 7 includes one longitudinal edge 32 which is perpendicular to the two end edges 34 and 36 of the blank, and an opposite longitudinal edge 38 which is inclined or tapered from the longer outside end edge 34 to the shorter inside or core end edge 36. The blank generally indicated at 40 in FIG. 8 includes a longitudinal edge 42 which is perpendicular to an outside end edge 44 which is longer than the shorter inside core end edge 46. The opposite longitudinal edge of the blank 40 includes a portion 48 beginning at the outside end edge 44 which is parallel to the longitudinal edge 42, and a longer inclined portion 50 which is inclined relative to the longitudinal edge 42 and extends to the inner core end edge 46. The blank generally indicated at 52 in FIG. 9 includes longitudinal edge 54 which is perpendicular to both the outside end edge 56 and the inside core end edge 58. The opposite longitudinal edge includes two portions 60 and 62 which are parallel to each other and to the longitudinal edge 54, but are stepped with respect to each other by means of the inclined longitudinal edge portion 64. The length of the blank 52 indicated at "A" in FIG. 9 may form a collet in which material may be inserted when the inner turns of the spiral coil are withdrawn to form the elongated tube. If desired, a collet-like projection may be provided on the outermost turn of any of the blanks of FIGS. 6–13 to hold material inserted therein.

The blank of FIG. 6 has the tab 24 and each of the various blanks of FIGS. 7, 8 and 9 has a separate tab 66 adjacent the end edge of the blank which forms the innermost or core end of the spirally wound coil. Tab 66 may be a short strip of adhesive tape, or a loop of fabric, string, or ribbon, or a strip of any suitable material attached to the blank adjacent the edge of the blank which forms the core end of the innermost spiral turn of the spirally wound cylinder of FIGS. 1–5.

The tab member for pulling the coil turns axially outwardly to form the elongated tube, may also be formed integrally with the blank in a stamping or punching operation if desired. Thus, in the embodiment of FIGS. 10, 11 and 12, the blank generally indicated at 67 may have a tab portion 68 integral therewith formed by a punching or stamping operation. To strengthen the tab, the entire core end edge 70 of the blank 67 may be foldable about fold line 72 and the two facing surfaces formed by the folding operation may be suitably joined by adhesive or the like. This construction provides a double thickness of material at the innermost or core end of the blank which includes the projecting tab portion 68.

In an alternative construction shown in FIG. 13, there is shown a blank 74 having a tab 76 extending integrally from one end thereof and formed during the punching of stamping of the blank.

An important feature of the construction is the use of a suitable means for locking the extensible tube in its extended position, either permanently, or in such manner as to temporarily prevent retraction of the tube. The locking means may assume various forms. As shown in the embodiment of FIGS. 2, 4 and 21, one or more rubber or elastic bands 20 may be positioned around the outermost turn of the spirally wound coil 16 intermediate the length of the original "cylinder" of the coil. The elastic bands 20 are tensioned to provide a compressive force which tends to retain the coil 16 at the desired outside diameter prior to the insertion of the coil in a suitable holding means such as the recess 14 of the sponge 12. The tensioned elastic band or bands 20 also provide a compressive force which tends to reduce the diameter of the coil 16 when the innermost turns of the coil are withdrawn to form the elongated handle shown in FIG. 1. The radially inwardly acting closing force applied to the outermost turn of the coil 16 upon the withdrawal of the inner turns reduces the diameter of the remaining outer turn or turns of the coil and provides a locking action which prevents the extended tube from being retracted again into the original cylinder, so that the handle or other element formed by the elongated tube remains in its extended position. On the other hand, in certain applications where it may be desired to be able to return the elongated tube to its retracted position, the degree of force applied by the locking means may be suitably regulated by proper design and/or selection of the locking means to permit the elongated tube to be returned to its contracted position when desired.

As shown in the embodiment of FIG. 20, a single elastic band 78 may provide the compressive load on the outermost turn of the spirally wound coil which provides the necessary locking action to prevent or control the retraction of the elongated tubular member into its original "cylinder."

The embodiment of FIG. 21 uses several elastic bands to provide the compressive force which locks the extended tube against retraction. The embodiment of FIG. 21 is similar to the embodiment shown in FIGS. 1–4, but shows the tube in its extended position.

In the embodiment of FIG. 22, a spring clip of U-shaped cross section, made of metal, plastic, or other suitable material, grips the outer peripheral surface of coil 16 to provide the necessary locking action, in the same manner as the elastic bands 20 and 78 previously described. A similar locking action is provided by a helical spring indicated at 82 in FIG. 23. Also, rubber tape having an adhesive coating thereon may be wound about the outer surface of the coil 16 to provide the compressive force which provides the locking action when the inner turns are withdrawn axially from the coil.

Still another locking arrangement may be that shown in FIGS. 25 and 26 in which a lug 84 is struck from the longitudinal edge of the strip material forming the coil, the lug being bent upwardly and outwardly in overlapping relation to an adjacent helical turn of the extended tubular member. The engagement of the overlapped lug 84 with respect to the adjacent helical turn of the tube provides a locking action which resists axial contraction of the extended tube and maintains the tube in its extended position. This overlapped lug locking arrangement is also utilized in the extensible and retractible tripod leg construction shown in FIG. 18 and in the extensible and contractible wall-mounted support member or hook shown in FIG. 19 to selectively control the position of the extended tubular member of the embodiments of FIGS. 18 and 19 in either extended or contracted position.

When the overlapped locking lug 84 is used as shown in FIGS. 25 and 26, or as shown in FIGS. 18 and 19, the lug may be withdrawn from its overlapped relation with respect to the adjacent helical turn of the extended tubular member to permit movement of the tubular member to its retracted position.

Still a further method of providing a locking action, not illustrated in the drawings, is to preform the outermost end of the strip which forms the spiral coil, that is, the end which lies on the outer periphery of the wound coil, in such manner that the outer end of the coiled strip is "set" to a diameter smaller than the final designed outside diameter of the spirally wound coil. Thus, the outer end of the coil having the "set" provides a compressive force which tends to decrease the diameter of the coil when the inner turns of the coil have been withdrawn. This presetting of the outermost end of the coiled strip to have an outer diameter less than the designed outer diameter of the coil is applicable principally where the strip of which the coil is formed is made of plastic or metal. It is also applicable where a strip has plastic or metal applied to the outermost end thereof to facilitate the application of a "set" to the outer composite end (metal plus paper or plastic plus paper) of the strip. Also, the entire strip may be treated to give it a "set" similar to a negator spring, with constant or variable pre-load.

For certain applications it may be desirable to utilize a strip material having a "set" in either the direction of coiling or in the opposite direction, either of which may be useful under certain conditions under which the coiled member may be used.

The locking action required to hold any given extended tube in its extended postion may vary, depending upon various conditions. Thus, where the spirally wound strip is formed of a material having a high surface friction, the locking means such as the elastic band or other locking means, is not required to exert as much force to obtain a locking action as it would if the spirally wound strip were formed of a material having a smooth, low-friction surface.

Also, under certain circumstances, it may be desirable to have the handle or tubular member retractable, in which case the locking member, such as the elastic band or other locking means may be so designed and selected as to permit the elongated tubular member to be pushed back to its original coil form by a relatively small force.

There is shown in FIGS. 14 and 15 a modified cleaning device generally indicated at 90, including a sponge member 92 which may be generally similar to the sponge 12 previously described except that the sponge 92 does not include a recess therein for receiving the extensible handle. Instead, the extensible handle, generally indicated at 94, and which is similar to the handle 16 of the embodiment of FIGS. 1–5, is received and gripped between two clamp elements generally indicated at 96 positioned adjacent opposite major surfaces of sponge 92. Each clamp element 96 and 98 includes a flat shank portion which is suitably bonded to the outer surface of the sponge 92, and a pair or arcuate portions 100 and 102 which extend in laterally spaced relation to each other from the inner ends of the shank portions of the clamp elements and embrace a substantial portion of the outer surface periphery of the handle 94. The spacing between the two arcuate portions 100 and 102 of each clamp 96 and 98 defines a recess 104 which may receive a single arcuate portion 106 extending from shank portions of opposing second clamp elements 108 and 110. A second sponge 92' is received and adhered between the shank portions of the two oppositely-disposed clamp elements 108 and 110. When the handle member 94 is withdrawn to its axially-extended position, the clamp elements 96, 98 and 108, 110 provides a compressive force which reduces the outer diameter of the outermost turn of the original "cylinder" of spirally wound handle 94 to thereby provide a locking action in the same manner as that provided by the other locking means hereinbefore described.

In addition to the various locking means and methods hereinbefore described for holding the extended tube in extended position, various other methods and structural modifications may be employed to maintain the tube in extended position, as follows:

(1) A suitable non-slip material may be applied to the surface of the elongated strip forming the spirally wound coil. The non-slip material may be a latex-type coating, the latex being preferably slightly uncured.

(2) The surface of the strip may be embossed to provide a non-slip effect when the tube is in extended position, (3) Strip material may be used which has been given a permanent set which tends to maintain the elongated tube in extended position.

The force provided by any particular locking means which is used may be varied to meet specific design requirements and to compensate for variations in surface friction of the material of which the spirally wound strip is formed. The force provided by the locking means may also be selected so as to make it possible to retract the extended tube where this is desired.

In the modified embodiment of FIGS. 16 and 17, there is shown a sponge generally indicated at 112, which may be generally similar to the sponge 12 of the embodiment of FIGS. 1-5, and which includes a long slit 114 in which is positioned an extensible handle member 116. The opposing walls of this slit 114 are impregnated with waterproof adhesive material to a thickness as indicated at 118 to stiffen the inner core of the sponge to thereby limit the water absorption of the sponge, which reduces the weight of the wet sponge and improves the handling properties of the cleaning device. This stiffening of the core of the sponge by the impregnation of adhesive as just described causes the sponge itself to exert a compressive force on the outer turn of the coil forming the handle 116, to thereby provide a locking action on the handle when the inner turns of the spiral coil are withdrawn.

There is shown in FIG. 18 another application of the extensible tube in which the tube forms a leg 122 of a tripod generally indicated at 120. The leg is formed of a strip spirally wound into coil form, similar to the coil 16 in FIG. 2, and suitably attached to a platform or table element 124. The end of the tube which is attached to the table element 124 may be beveled or cut at a bias so that the leg 122 extends at an angle with respect to the vertical axis of the tripod.

The leg 122 of the tripod of FIG. 18 is held in its extended position by a lug 126 similar to the lug 84 described in connection with the embodiments of FIGS. 25 and 26. However, it will be noted that the lug 126 of the tripod leg is positioned on the strip which forms the elongated tube at a location such that the lug is located in a spiral turn immediately below or closely adjacent the outermost spiral turn so that the lug 126 overlies the outermost spiral turn 128 at the axially inner end of the elongated tube.

Another application of the extensible tube is seen in FIG. 19, which shows a tube defining a retractable wall hook generally indicated at 130 fixed to a wall 131 and formed of a spiral coil similar to that generally indicated at 16 in FIG. 1. The inner axial end of the original cylinder of the spirally wound tube 130 is suitably attached to a mounting panel 132, and the tube 130 includes a lug 134 similar to the lug 84 of FIGS. 25 and 26 and to the lug 126 of FIG. 18. Lug 134 is located along the strip in such manner as to overlie the outermost turn 136 of the original cylinder when the tube is extended. In both the embodiments of FIGS. 18, 19, the extensible tube may be retracted into the original cylinder by withdrawing the lug 126 of FIG. 18 or the lug 134 of FIG. 19 from its overlying relation with respect to the outermost turn of the original cylinder and then retracting the extended tube back into its position in the original cylinder. A pull tab member 138 is provided on the tube 130 by which the tube is extended.

There is shown in FIGS. 27 and 28 a still further embodiment in which two strip members 140 and 142 are spirally wound together to form a spiral coil generally indicated at 138, FIG. 28. The innermost ends of each of the strips 140 and 142 may be provided with a tab which permits the strips to be pulled outwardly in opposite axial directions to form a device such as the clothes hanger generally indicated at 144 in FIG. 27. The outer surface of the original cylinder of the double-wound coil is defined by the surface of the outermost turn of the outer strip 140'. The hanger of FIG. 27 may also be constructed using separate spirally wound coils supported by and received within a centrally-located tubular member or bushing, with each of the spirally wound coils being pulled outwardly in opposite directions to form extended tubular arms such as those shown on the clothes hanger of FIG. 27. A hook 146 may be suitably mounted on the outer periphery of the original cylinder 140' or on the outer surface of the central tubular support member where two separate spiral coils are used.

Two or more strips may be spirally wound together either for structural purposes, as shown in FIGS. 27-29, or for decorative effects. When two strips each having a different color are spirally wound together, a candy stripe effect is provided when the tube is extended with both strips extending axially in the same direction.

It can be seen from the foregoing that there is provided in accordance with this invention an extensible tube which has many advantages and which can be used in many different applications. The extensible tube provides a light weight, economical handle, leg, or other body element which may be used as a component part of many different devices, and which may be packed, stored, transported, and merchandised in a small compact form and which may be extended when the elongated form is required. The extensible tube has particular utility as an extensible handle for disposable cleaning tools, such as a cleaning tool for toilet bowls and the like, and may also be used in a wide variety of other applications.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What is claimed is:

1. A cleaning tool comprising a cleaning body member, an extensible handle member for said tool, said handle member comprising an elongated strip of resilient material wound on itself in a plurality of radially superposed spiral turns to form a spiral coil of generally cylindrical shape, means extending from the innermost spiral turn of said coil whereby the inner spiral turns of said coil may be withdrawn axially outwardly from the radially outermost turn of said coil to an axially extended position to form an elongated tapered tubular handle member for said cleaning tool, and at least the outer turns for the handle strip being set to provide contracting resiliency of these turns upon the inner turns being extended and serving by the contraction thereof to prevent the retraction of the inner turns after they have been withdrawn, and means for securing the handle member to said cleaning body member.

2. A cleaning tool comprising a cleaning body member, a recess in said body member, an extensible handle member positioned in said recess in said body member, said handle member comprising an elongated strip of material wound on itself in a plurality of radially superposed spiral turns to form a spiral coil of generally cylindrical shape, and means extending from the innermost spiral turn of said coil whereby the inner spiral turns of said coil may be withdrawn axially outwardly from the radially outermost turn of said coil to an axially extended position to form an elongated tapered tubular handle member for said cleaning tool, said handle member being secured in said recess.

3. A cleaning tool comprising a cleaning body member, a recess in said body member, an extensible handle member positioned in said recess in said body member, said handle member comprising an elongated strip of material wound on itself in a plurality of radially superposed spiral turns to form a spiral coil of generally cylindrical shape, means extending from the innermost spiral turn of said coil whereby the inner spiral turns of said coil may be withdrawn axially outwardly from the radially outermost turn of said coil to an axially extended position to form an elongated tapered tubular handle member for said cleaning tool, and means for maintaining said handle member in its extended position, said handle member being secured in said recess.

4. A cleaning tool as defined in claim 3, in which said cleaning body member is made of sponge material, and said body member is impregnated with a stiffening material in the region of the recess which receives said extensible handle member, whereby said body member exerts a radially inward compressive force on the radially outermost turn of said spiral coil to prevent axial contracting movement of said inner spiral turns after said inner spiral turns are withdrawn from said radially outermost turn.

5. A cleaning tool comprising a sponge cleaning body including two oppositely disposed major surfaces, a pair of oppositely disposed clamp elements each including a shank portion and an arcuate portion, the shank portion of each clamp element being secured to one of the major surfaces of said cleaning body, the arcuate portion of each clamp element extending beyond the major surfaces of the cleaning body and lying in spaced facing relation to the arcuate portion of the other clamp element, and a handle member for said tool, said handle member comprising an elongated strip of material wound on itself in a plurality of radially superposed spiral turns to form a spiral coil of generally cylindrical shape, means extending from the innermost spiral turn of said coil whereby the inner spiral turns of said coil may be withdrawn axially outwardly from the radially outermost turn of said coil to an axially extended position to form an elongated tapered tubular handle member for said cleaning tool, said handle member being secured between the facing arcuate portions of said oppositely disposed clamp elements in the region of said handle formed by the radially outermost turn of said spiral coil.

References Cited by the Examiner

UNITED STATES PATENTS

| | | | |
|---|---|---|---|
| 785,822 | 3/05 | Mitchem | 206—53 X |
| 1,379,734 | 5/21 | Wagner | 43—116 |
| 1,983,251 | 12/34 | Tongue | 43—116 |
| 2,130,728 | 9/38 | Berkman. | |
| 2,495,967 | 1/50 | Hamilton | 46—1 |
| 2,670,918 | 3/54 | Kinnard | 248—191 |

FOREIGN PATENTS

| | | |
|---|---|---|
| 387,215 | 7/08 | France. |
| 572,194 | 2/24 | France. |
| 374,805 | 5/23 | Germany. |
| 600,158 | 7/34 | Germany. |
| 15,357 | 1910 | Great Britain. |
| 10,516 | 12/99 | Switzerland. |

CHARLES A. WILLMUTH, *Primary Examiner.*